(12) United States Patent
Bijl et al.

(10) Patent No.: US 6,366,882 B1
(45) Date of Patent: *Apr. 2, 2002

(54) APPARATUS FOR CONVERTING SPEECH TO TEXT

(75) Inventors: David Bijl, Malvern; Henry Hyde-Thomson, London, both of (GB)

(73) Assignee: Speech Machines, Plc, Northhampton (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,744

(22) Filed: Mar. 27, 1998

(51) Int. Cl.[7] .............................................. G10L 15/00
(52) U.S. Cl. ....................................... 704/235; 704/231
(58) Field of Search ............................... 704/235, 245, 704/243, 244, 236, 270, 277

(56) References Cited

U.S. PATENT DOCUMENTS

| 5,541,836 A | * | 7/1996 | Church et al. ......... 364/419.07 |
| 5,546,538 A | * | 8/1996 | Cobbley et al. ............ 704/200 |
| 5,553,119 A | * | 9/1996 | McAllister et al. ........... 379/67 |
| 5,625,748 A | * | 4/1997 | McDonough et al. ....... 704/251 |
| 5,721,827 A | * | 2/1998 | Logan et al. ............... 704/200 |
| 5,745,875 A | * | 4/1998 | Jackson et al. ............. 704/235 |

* cited by examiner

Primary Examiner—Fan Tsang
Assistant Examiner—Michael N. Opsasnick
(74) Attorney, Agent, or Firm—Kilpatrick Stockton LLP

(57) ABSTRACT

A speech-to-text conversion system which comprises a plurality of user terminals for recording speeches, at least one automatic speech recognition processor to generate text from recorded speeches, and communication links to return corresponding texts to respective users. At least one automatic speech recognition processor improves recognition accuracy using data of the recorded speeches and the corresponding texts, the data being selected dependent upon subject matter area.

22 Claims, 15 Drawing Sheets

APPARATUS FOR CONVERTING SPEECH TO TEXT

FIELD OF THE INVENTION

The present invention relates to apparatus and methods for speech to text conversion using automatic speech recognition, and has various aspects.

BACKGROUND OF THE INVENTION

Automatic speech recognition, as such, is known from, for example, "Automatic Speech Recognition" by Kai-Fu Lee, Kluwer Academic Publishers 1989.

Conventional known systems for converting speech to text involving automatic speech recognition are desktop stand alone systems, in which each user needs his or her own system. Such known speech to text conversion systems have been produced by such companies as International Business Machines, Kurzweil Applied Intelligence Inc and Dragon Systems.

When performing automatic speech recognition, adaptation is known to improve system performance. Adaptation is a mathematical process where descriptive models are fine-tuned. In particular, speaker adaptation adapts models to better fit the speech characteristics, and language adaption adapts to word usage of the speaker.

When performing ASR adaptation the performance is judged by the accuracy of the resulting text and the time required to produce it. Improving performance is primarily related to improving accuracy, though improvement is also achieved when the required computation time is reduced.

Known systems for Automatic Speech Recognition (ASR) model the acoustical patterns of speech and the word patterns of the language used. Although speech recognition is performed using both speech and language models within a statistical framework, the two are constructed independently.

Acoustical modelling captures the nature of different sounds. A word can be described, via a pronouncing dictionary, as some combination of these sounds.

Language modelling captures the likelihood that a given word occurs in some context. It is necessary, in practice, to compile statistic likelihoods from large amounts of data collected over time.

Language models are adapted by applying millions of words and would therefore not be of benefit for a long time indeed from occasional or regular usage of dictation by an individual.

Known ASR systems use pattern matching and other known techniques:

(1) to match acoustic speech patterns with sub-wound units (typically phoneme related),
(2) to associate sub-word vectors with orthographic words (using a pronouncing dictionary),
(3) to represent and exploit the likelihood that a particular word will occur given its location relative to other surrounding words,
(4) to search to find the best text sequence by examining all possible word sequences and selecting the one which best concords the given acoustic utterance and the knowledge expressed in (1), (2) and (3) above.

Known ASR systems decode an acoustic pattern into a word sequence by appropriate use of this information. To adapt the recognition system requires both acoustic (sub-word parameter, as in (1)) and language (word using statistic, as in (3)) adaptation. A pronouncing dictionary, as in (2) is usually static except that new words, ie. those encountered in real use but absent from the system dictionary, must be added to it.

Known speech recognition technology is based on sub-word modelling. This requires each word to have a known pronunciation. Given that pronunciation, any word can be assimilated into a recognition system. In practice, words will occur for which no pronunciation is known in advance. So-called "Text-To-Speech" technology exists to invent a plausible pronunciation. However these are complicated and can be inaccurate, involving considerable hand-crafting effort.

The correct transcription of an audio recording to be used for adapting the ASR system is a word-for-word verbatim text transcript of the content of that speech recording.

The transcripts returned from audio typists may not match the word-for-word speech. For example, embedded instructions may have been interpreted (eg. delete that sentence), information inserted (eg. insert date), stylisation applied (date and number format), or obvious mistakes corrected (eg. "U.S. President Abram Lincoln" might be manually corrected to "Abraham Lincoln"). When applied in ASR adaptation these variations between the speech and corrected text can cause errors.

Known ASR use speaker independent acoustic modelling. The models can be adapted through usage to improve the performance for a given speaker. Speaker dependent models are unpopular, because they require a user to invest time (usually one or two hours) before be or she can use the ASR system.

BRIEF SUMMARY OF THE INVENTION

In a first aspect, the present invention relates to a speech to text convertor comprising a plurality of user terminals for recording speeches, at least one automatic speech recognition processor, and communication means operative to return the resulting texts to the respective user, in which at least one automatic speech recognition processor is adapted to improve recognition accuracy using data of the recorded speeches and the resulting texts, the data being selected dependent upon subject matter area.

This advantageously provides subject-matter area specific adaptation whereby data from previous user's in a subject matter area is used to improve performance of automatic speech recognition processors for subsequent users in that subject matter area.

New users benefit from previous adaptation using data according to their subject matter area. Both occasional and regular users benefit from adaptation using data from others in their subject matter area.

Data for adaptation is preferably accumulated by pooling according to subject matter area prior to adaptation. In particular, given, say hundreds or thousands of users over time but a much fewer number of subject matter areas, (say five or ten), data for adaptation is quickly accumulated by pooling according to subject matter area.

The subject matter areas can be various disciplines, such as legal, medical, electrical, accounting, financial, scientific and chemical subject matter areas; also personal correspondence and general business.

Preferably language models are adapted dependent on which subject matter area they are used for using data from that subject matter area. New words which occur in a subject matter area are acquired by a language model for each new word being provided, and subsequently adapted. The probabilities of word occurrences dependent on subject matter area are learnt and used for improved automatic speech recognition accuracy.

Preferably, each recorded speech has an indicator of subject matter area and the selection of data for adaptation is dependent upon the indicator. This indicator can be provided by the user or determined and applied subsequently.

Preferably, the data for adaptation can be selected dependent not only on subject matter area but also on the user's accent grouping. This can further improve accuracy of automatic speech recognition.

In a second aspect, the present invention relates to a speech to text convertor comprising a plurality of user terminals for recording speeches, at least one automatic speech recognition processor, and communication means operative to return the resulting texts to the respective user, in which at least one automatic speech recognition processor is adapted to improve recognition accuracy using data of the recorded speeches and the resulting texts, the data being selected dependent upon accent group.

Accent group specific adaptation advantageously enables data from previous user's in an accent group to be used to improve performance of automatic speech recognition processors for subsequent users belonging to the same accent group. In particular, as a result of previous adaptation, acoustic models are closer to the new user's speech giving improved performance.

Data for adaptation is preferably accumulated by pooling according to accent group prior to adaptation.

The accent groups can refer to country, region and/or city, eg. United Kingdom, United States or any other specific accents or sub-accents.

Preferably acoustic models are adapted dependent on which accent group they are used for using data from that accent group.

Preferably, each recorded speech has an indicator of accent group. This indicator can be provided by the user or determined and applied subsequently.

Preferably, the data for adaptation can be selected dependent not only on accent grouping but also on subject matter area or other feature. This can further improve accuracy of automatic speech recognition.

In a third aspect, the present invention relates to a speech to text convertor comprising a plurality of user terminals for recording speeches, at least one automatic speech recognition processor, and communication means operative to return the resulting texts to the respective user, in which at least one automatic speech recognition processor is adapted to improve recognition performance using data of the recorded speeches and the resulting texts selected from more than one user.

The data is preferably suggested from multiple users.

Each recorded speech preferably has an indicator and the data is selected dependent on the indicator.

An indicator comprises information about the recorded speech with which it is associated. The information can comprise the user's company, address and/or identity. The information can comprise information of the user's expected usage, such as user's subject matter and/or identity of the user terminal used. The user terminal can be a telephone or microphone. The information can comprise information known about the user for example from previous questioning, such as gender. The information can comprise processing instructions such as output format of resulting text and/or urgency rating.

The data is preferably recorded such that data for adaptation can be selected from all the recorded speeches and resulting texts from a user. Data can preferably also be selected from other recorded speeches and/or texts made by the user when not using the speech to text convertor.

The adaptation is preferably performed in a hierarchical manner. By requiring one or more indicated properties, data can be selected in various ways for adaptation. In particular, after a first adaptation, an additional indicated property or indicated properties can be required when selecting data for further adaptation. For example, first a particular accent country then also an accent region can be required; or for example, first accent group then also subject matter area can be required.

The invention in its various aspects, has the advantage that improvements in automatic speech recognition performance are shared between users, in particular by adapting the automatic speech recognition processors dependent on previous user's subject matter area and/or accent grouping.

As regards the invention in all its aspects:

When speech is recorded, associated identifiers of the user's identity and/or accent group and/or subject matter area are also stored. The identifiers can be selected by the user. In particular, the identifiers can be selected from predefined lists, for example, using a mouse or arrow-keys on a user's terminal to select from pull-down type lists. The last identifiers selected by the user can be stored as a future preference.

Preferably, upon the recorded speech being received by one of said automatic speech recognition processors, the identifier of accent group is used to select the acoustic models to be applied in automatic speech recognition and/or the identifier of subject matter area is used to select the language models to be applied in automatic speech recognition.

Preferably, the identifier of user's identity can also be used to select the acoustic models to be applied. This has the advantage of further improving the accuracy of automatic speech recognition.

Preferably, said at least one user terminal is remote from said at least one automatic speech recognition processor. Preferably, the speech to text convertor includes a server remote from said at least one user terminal, the server being operative to control transfer of recorded speech files to a selected automatic speech recognition processor.

Preferably, the or each user terminal communicates the recorded speech files to the remote server by electronic mail.

The term "electronic mail" is intended to include Internet "File Transfer Protocol" and "World Wide Web".

The text files resulting from automatic speech recognition are preferably sent to correction units. The correction units are preferably remote from the automatic speech recognition processors. Communications from the automatic speech recognition processors to each correction unit are preferably undertaken under the control of the server, and preferably by electronic mail. The correctors are preferably remotely distributed.

The corrector units can preferably communicate to said at least one user terminal by electronic mail.

The corrector unit preferably includes a visual display unit for display of the text and a manual interface, such as a keyboard and/or mouse and/or a foot pedal control, usable to then select text portions.

Correction is effected by the manual operator. The corrections can be recorded and transmitted back to the automatic speech recognition processor which undertook the automatic speech recognition for adaptation of the operation of the automatic speech recognition processor. These corrections are preferably sent by electronic mail. The adaptation has the effect of making the automatic speech recognition more accurate in future processing.

Data of recorded speeches and resulting texts are preferably screened for mismatches before adaptation Speech words without corresponding text words are not used for adaptation. Mismatches are determined automatically when speech words and resulting text words, which are those after correction, do not satisfy a predetermined set of grammatical rules with sufficient accuracy.

The recorded speech can be sent to the selected correction unit for correction of the text file resulting from automatic speech correction. The server can control this selection. The choice of correction unit can depend on the accent of the speaker of the recorded speech, in particular the files can be sent to a correction unit in an area where that accent is familiar, or to a correction unit where the particular human corrector is familiar with that accent.

If the resulting correct text includes text words not recognised by the automatic speech recognition processor, pronunciation dictionary entries can be created for them. The pronunciation dictionary entries are preferably created using text to phoneme conversion rules. Text words not previously recognised are identified by comparing each text word with those in a database of words, preferably stored in the automatic speech recognition processor.

The recorded speech is preferably continuous speech.

The server acts to control assignment of recorded speech files for processing to automatic speech processors by queuing the received speech files and submitting them according to predetermined rules. This allows high utilisation of the available automatic speech recognition resources, according to an off-line or batch processing scheme.

Speech to text conversion can be done as a single fully automatic operation, or as a part-automatic and part-manual operation using the automatic speech recognition processor and corrector unit respectively.

Undertaking the speech to text conversion in a non-interactive and off-line basis prevents the user switching repeatedly between speech recording and speech correction tasks. This results in improved efficiency.

The predetermined rule or rules by which the server queues jobs can be according to urgency or user priority ratings.

The present invention relates in its various aspects both to apparatus and to corresponding methods.

BRIEF DESCRIPTION OF DRAWINGS

A preferred embodiment of the present invention will now be described by way of example, and with reference to the drawings, in which.

DETAILED DESCRIPTION OF PREFERRED EMBODIMENT

Figure 1:
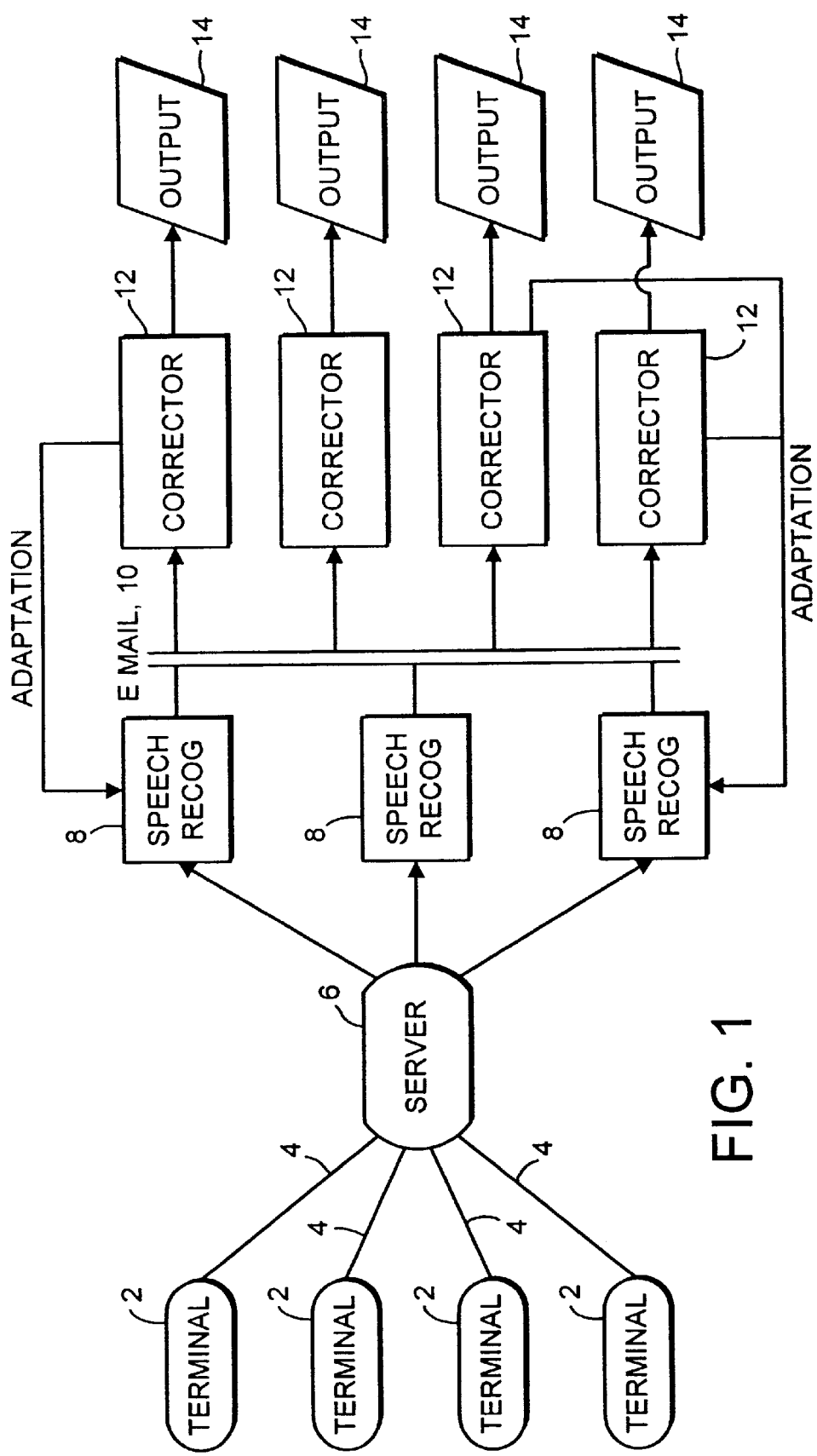
FIG. 1 is a simple schematic illustrating the speech-to-text dictation system.

As shown in FIG. 1, the system consists of user terminals 2 attached by E-mail or phone links 4 to a server 6. The server is connected via a network to a number of processors 8 for speech recognition. These processors 8 are connected via electronic mail (E-mail) links 10 to corrector terminals 12. The corrector terminals 12 will be described in more detail later. Each corrector terminal 12 has at least one output terminal 14.

The system basically operates by speech being captured at the terminals 2 and sent via links 4 to the server 6. The server controls the speech-to-text conversion operations in particular by sending the speech to speech recognition processors 8 for conversion to text data. This text data is transferred via E-mail 10 to remote corrector terminal 12. The text data is displayed and corrected by an operator. After correction the text is output via output terminal 14 and returned to the client. The corrections made are reported to the speech recognition processor 8 for adaptation purposes to improve the accuracy of subsequent speech recognition.

As will be discussed below, the server 6 acts to queue the speech-to-text conversion jobs and assign them to the various speech recognition computers 8.

A client may submit dictation at any time, and under the control of the server 6, this is forwarded to a selected speech recognition processor 8 for processing.

Basic Function of the Dictation System

Figure 2:
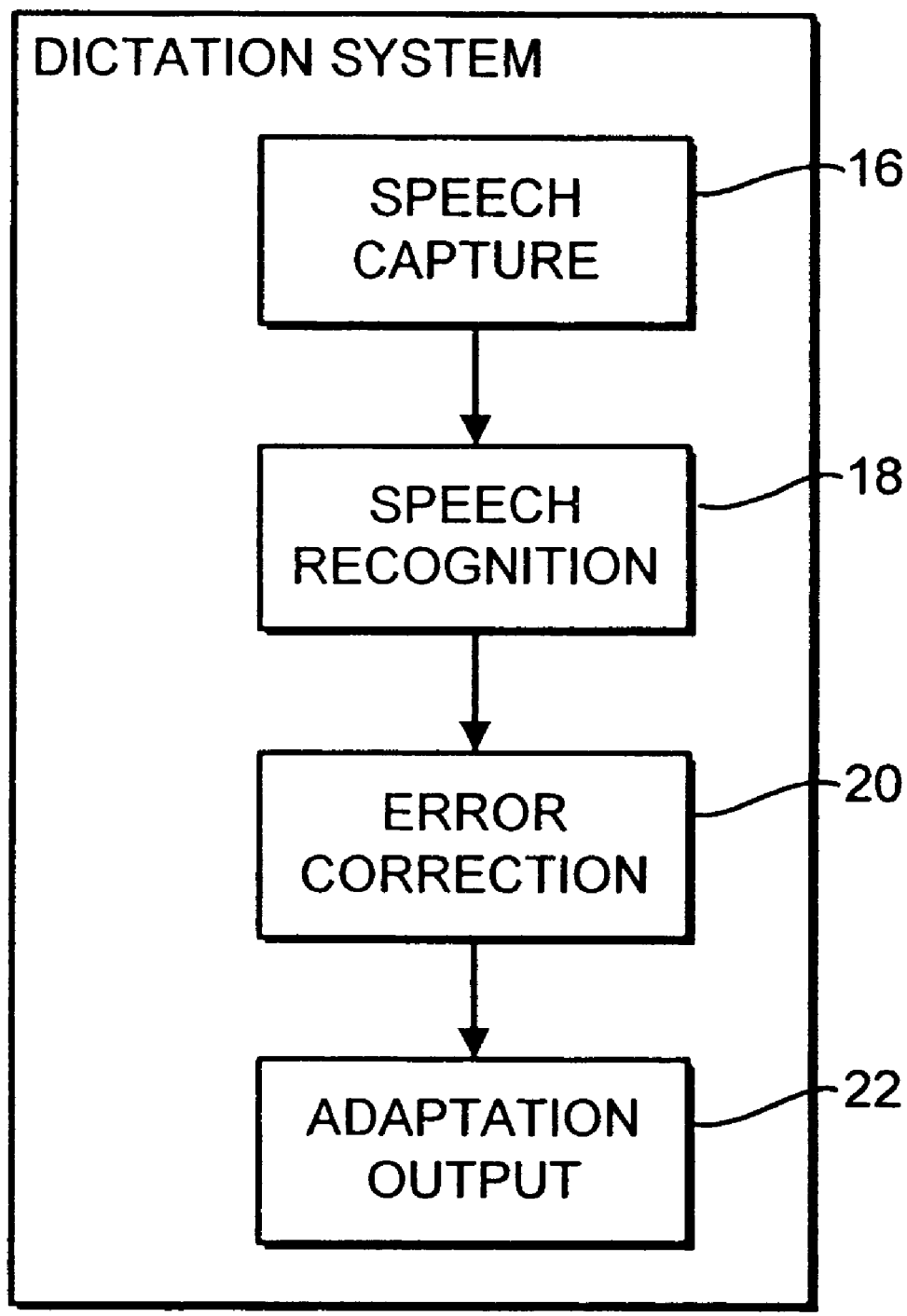
FIG. 2 is a simple block diagram illustrating the basic function of the system.

As shown in FIG. 2, the basic stages in the operation of the dictation system, which are shown in FIG. 1, are as follows:

There is a first stage of speech capture 16 in which the speech is recorded. There is then a stage of speech recognition 18. The subsequent stage is one of correction 20 and the final stage 22 is one of speech recognition adaptation and text output.

Figure 3:
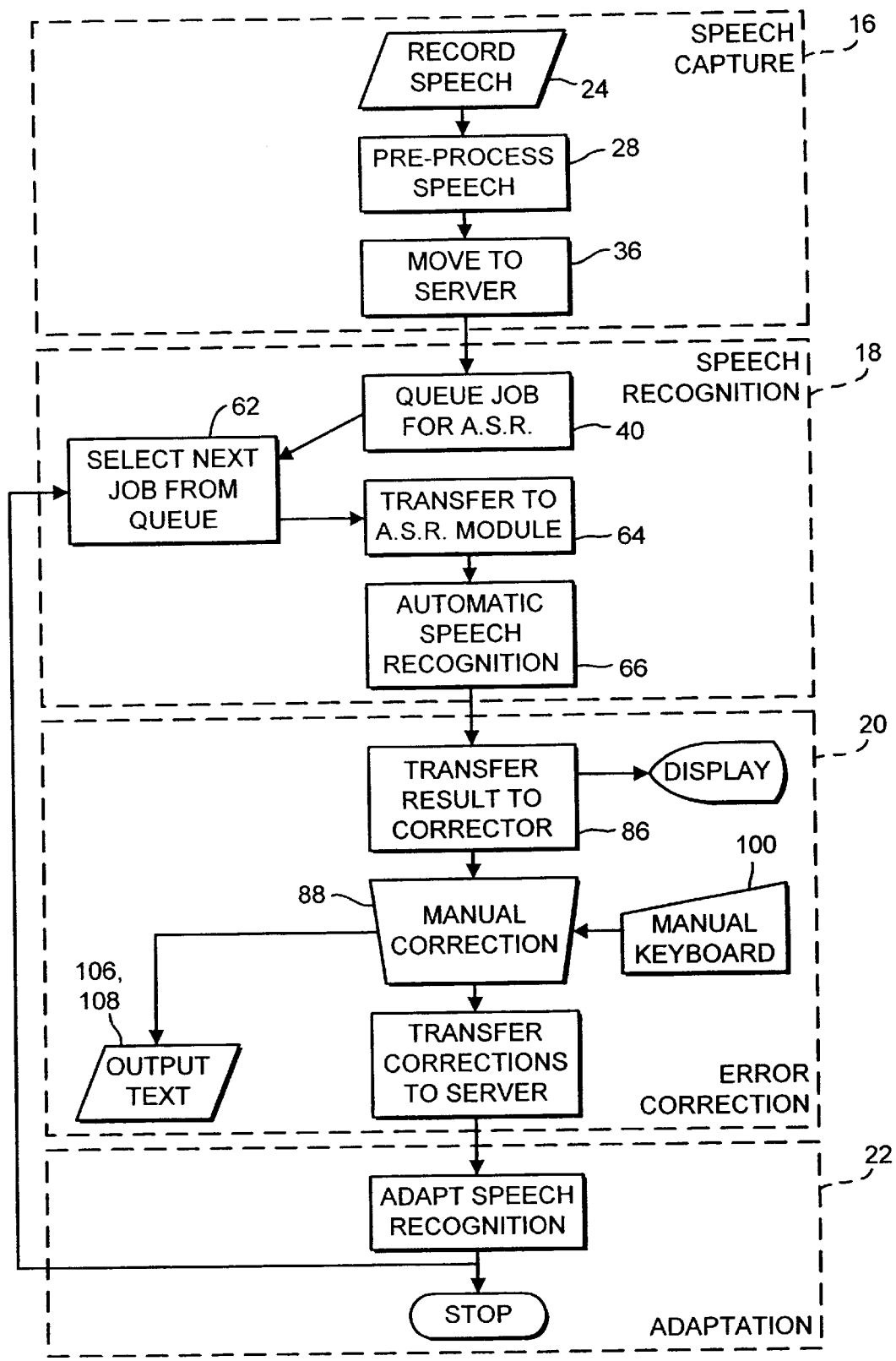
FIG. 3 is a schematic diagram illustrating the function shown in FIG. 2 in more detail.

Looking at these four stages in more detail as shown in FIG. 3, the speech capture stage 16 includes steps of speech recording followed by speech pre-processing followed by a step of transferring the pre-processed speech to the server in a "pack up and move" operation as described later.

The speech recognition stage 18 starts with a step of queuing the job for automatic speech recognition (ASR).

When the job is selected from the queue, it is transferred to a selected ASR processor 8. The operations of queuing and forwarding jobs are undertaken under the operation of the server 6, as discussed in more detail below. The speech is then operated on to produce a text file in an automatic speech recognition step.

In the error correction stage 20, the uncorrected text file is transferred to a corrector terminal 12 where it is displayed on a visual display unit (VDU). A manual operator controls a manual keyboard to effect manual correction. The corrected text is then returned to the client. This can be by being printed out and dispatched by post. Alternatively the text can be sent by fax or via the computer network, and server, back to the client terminal 2 or another designated user terminal 2 by E-mail. The corrections are transferred to the server.

In the adaptation stage 22, the corrections are returned from the server to the automatic speech recognition computer where they are used to adapt the speech recognition for greater accuracy in subsequent processing.

The various processing steps and operation of the server will now be described in more detail.

Speech Recording, Pre-Processing and Transfer to the Server

In the preferred embodiment, the user terminal 2 is a personal computer of the multi-media type including a voice recorder. In other embodiments, it could be a telephone handset or dictation recorder eg. dictaphone, or some other type of computer. A telephone handset can be digital or analog and could be cellular or radio handset or any other standard equipment for relaying audio speech. In further embodiments the user terminal could be a voice mail terminal or a recording apparatus as used in court rooms. The speech is recorded in continuous English, although the system could, of course, be adapted for other languages.

Once recorded, a request for dictation, which includes the recorded speech, is sent to the server 6. In preparing the dictation request, in some types of user terminal 2, as in the preferred embodiment, the speech is pre-processed so as to reduce the size of the dictation request.

The dictation request is sent to the server 6 via E-mail.

Figure 4:
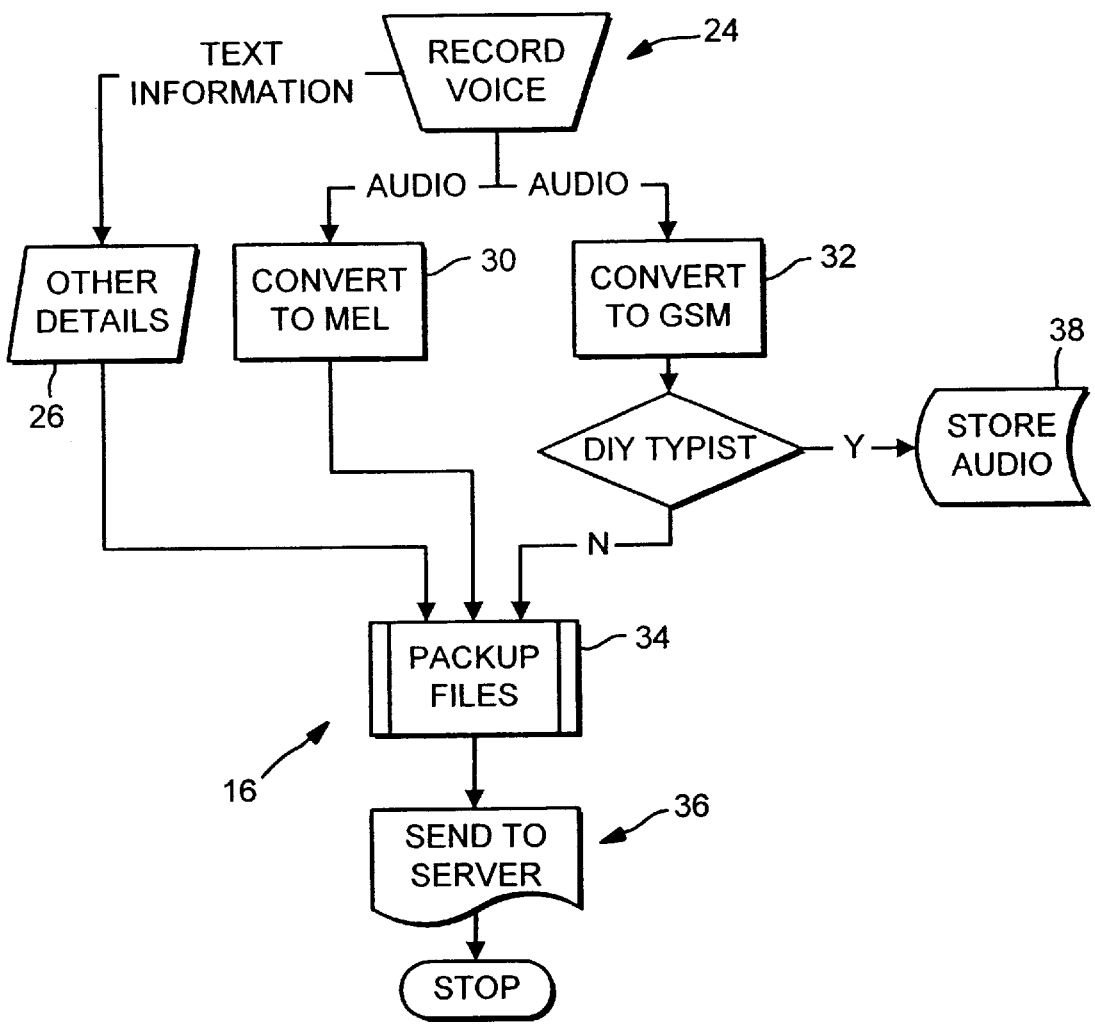
FIG. 4 is a schematic diagram illustrating the speech capture stage of the function.

As shown in more detail in FIG. 4 the speech capture stage 16 includes recording speech 24; which is, in the preferred embodiment, via a microphone input port on the personal computer user terminal 2. This user terminal 2 simulates an audio-cassette recorder in that the user is able to record, pause, rewind and play. Furthermore full-stop indicators can be included automatically in previous pause positions in the recording, and the user can rewind to a previous pause position to overwrite a sentence or series of sentences.

The user can indicate, via the keyboard (not shown) of the user terminal 2, text information of other details 26, for example, subject of the speech, language used, priority level for transcription, desired word-processor font and style template (eg. in Microsoft Word) of the resulting transcription.

The recorded speech 24 is then pre-processed 28 by conversion into two compressed digital data files. The recorded speech is processed 30 to derive a MEL file representation of the speech spectrum, and is also processed 32 to produce a compact GSM (Global System for Mobile) file by compression. A MEL file is a standard representation of the speech signal, see, for example, "Comparison of Parametric Representations for Monosyllabic Word Recognition in Continuously Spoken Sentences" by S Davis and P Mermelstein in Institute of Electronic and Electrical Engineering, IEEE ASSP-28, No 4, pp 357–366, 1980.

The MEL and GSM compressed representations of the speech are of sufficient quality to provide for accurate speech recognition whilst having a reduced amount of data which is required to be transmitted, and allowing intelligible audio replay.

The MEL and GSM compressed representations are packaged 34 into a single file for transmission together with further processing instructions and the other details (of subject etc). This is a "pack up and move" operation as described below. The file is then moved 36 to the server 6. The whole operation is performed as a built-in function described more fully below.

If the user has nominated himself or herself to perform manual correction of the result of automatic speech recognition (described in more detail below), the GSM compressed representation is electronically marked for DIY (Do it yourself) correction and is not transmitted to the server 6 but instead stored 38 in the terminal 2 for future recall. The user may elect that the GSM representation be sent via the server 6 to another user terminal 2 where he or she will correct the text data resulting from automatic speech recognition which is also sent to that other user terminal 2.

Server

The server, which is made up of a group of dedicated computers retrieves E-mail by polling or otherwise accessing an electronic mailbox, and acts to queue and control the dictation requests and to forward them to appropriate speech recognition processors 8. Basically, the server 6 can be considered as a multiple-input multiple-output queue controller. The server 6 provides multiple access to the automatic speech recognition (which can be considered as a finite resource) by delaying dictation requests until a speech recognition processor 8 is available. Overall delay is minimised and depends both on the loading of the system and timing of the dictation request. A priority is assigned to each dictation request depending on urgency and the grade of service available to particular clients. Essentially, the server 6 acts to delay processing of a dictation request until resources are available.

The following operations having been performed on the user terminal: pre-processing client speech into a dictation request, and packup-and-moving to a server (using electronic mail for transfer), the server acts to control the following operations:

1. queuing the execution of the transferred dictation request, 2. sending the dictation request to a speech recognition processor, 3. dictation processing using automatic speech recognition, 4. packup-and-moving the resultant draft text document to a corrector terminal, The correction terminal then is used to correct the draft text document, pack-and-moving the modifications of the dictation made at the connector terminal back to the server, the server then operates to:

5. submit the modifications to the adaptive learning process of the ASR processors, and 6. forward the text document to the originating client.

The server 6 operates in a manner analogous to an interpreter for DOS batch files, Windows NT command files or UNIX shell.

The server 6 controls the sequence of operations according to a "pack-up and move" scheme, which allows the degree of processing which has been undertaken to be included with the speech data as processed to that point in time and transferred to another part of the system for subsequent processing. The names and contents of speech files and other associated data files are also "packed" in the sense that references to them are included in the "pack-up and move" commands issued by the server 6.

Pack Up and Move

The server 6 (and also each user terminal 2 and correction terminal 12) is operated such that the server 6 (user terminal 2 or correction terminal 12) implements a series of operations, known as a "shell" for interpreting (by reading and executing) instructions defined in a script. A script is a text file consisting of a series of lower level instructions to be performed sequentially. These instructions include calls to subroutines, which can be notionally external computer programs, and calls to so-called "built-in" commands as explained more fully below. The external computer programs are for undertaking the various processes required in the transcription eg. as shown in FIGS. 4 to 9.

The server 6 (user terminal 2 or corrector terminal 12) scans each successive line of the script searching for known variable names (specifically alphabetical sequences preceded by a dollar symbol). If a known variable name is found, the corresponding value is read in from memory. The first word of each line of the script is also checked against a list of "built-in" commands. If found, a "build-in command" is executed as described below. Otherwise, the first word is assumed to be the name of an external computer program to which a subroutine call is made.

The script is interpreted line by line until the end of the script is found or some built in command indicates that operation should stop.

Figure 10:
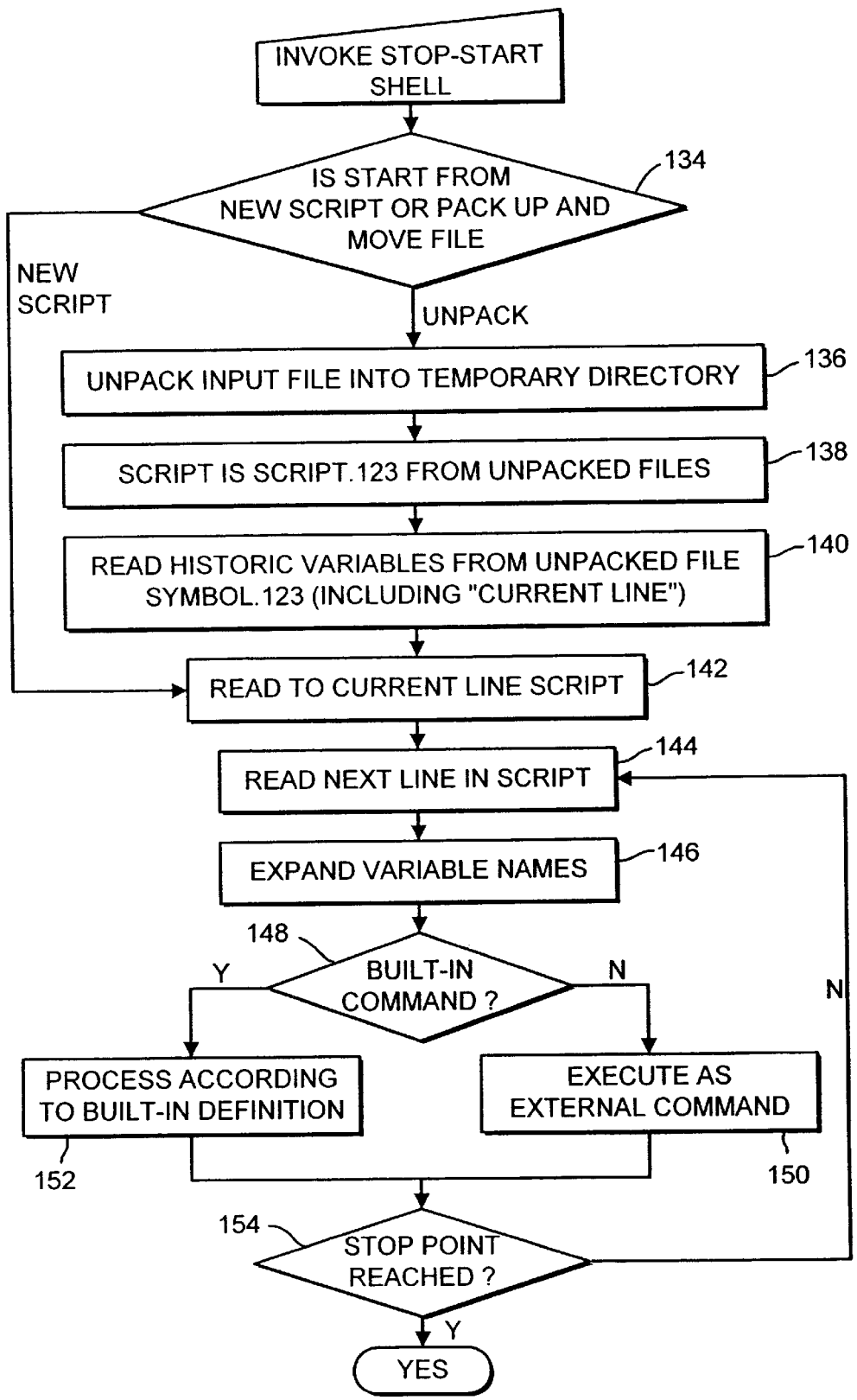
FIG. 10 is a schematic diagram illustrating the "pack-up and move" functioning of, for example, the server.

The sequence of operation starts, as shown in FIG. 10, by the server 6 determining 134 whether the file for interpretation is a new script file or a file which has been previously partially executed (known as a "pack-up and move" file) resulting from a "pack-up-and-move" command as described below.

If the file is a "pack-up and move" file, a temporary directory is created to which the file is written 136. The pack-up-and-move file is in two or more parts; one is a copy of the original script file, denoted in FIG. 10 by SCRIPT.123, which is opened 138. The second part is a copy of the symbol table, ie. the values of variables as were current at the time of execution of the last pack-up-and-move command. The symbol table, denoted SYMBOLS.123 in FIG. 10, is read 140 to provide the values to be used as initial values subsequent processing. One of the variable values is the line number denoted current line number, at which interpretation stopped previously. The script file is then read 142 until that current line number is reached. Other parts of the pack-up-and-move file are copies of those files that were specified for transfer by the last pack-up and move command. These files are made available (in a special temporary location) for subsequent operations.

The next instruction is then selected 144 as the first to be read and executed in resumed processing and variable values are taken 146 from the symbol table. The instruction is then analysed as mentioned above by inspecting its first word, to determine 148 whether the instruction is to a built-in command or a call to an external program.

A call to an external program is handled 150 by the operating system of the server 6 in a conventional manner. The resultant variable values being returned to the symbol table and the line number in the symbol table being incremented.

Built-in commands are handled 152 as described below.

When the stop command in the script is reached the execution terminates 154, else the next line of the script is read 144 and executed.

Built-in Commands

So-called "Built-in" commands include those for variable value control and basic control commands, such as IF and GOTO.

Figure 11:
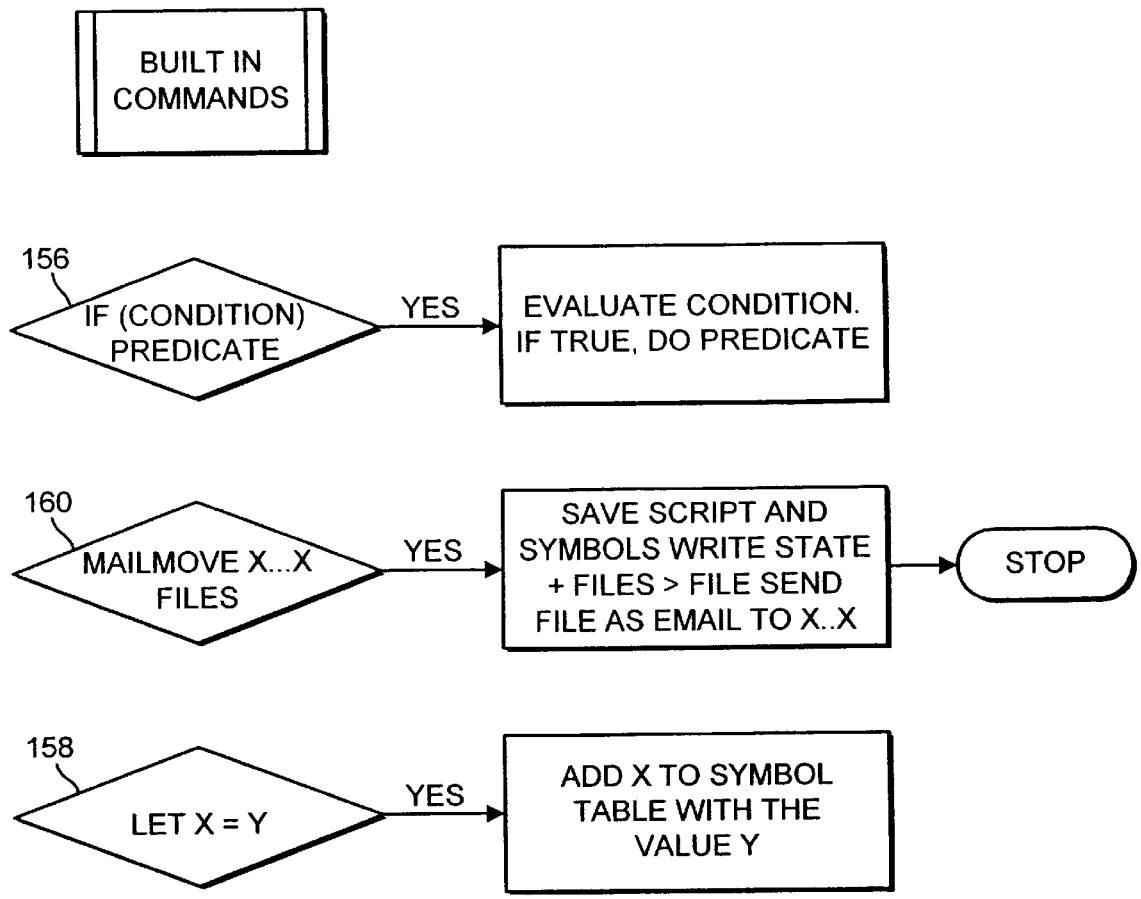
FIG. 11 is a schematic diagram illustrating the use of built-in commands in the pack-up and move functioning.

Examples of three built-in commands are shown in FIG. 11 together with indications of how each command is executed.

If the instruction is of the form "IF (condition) operation" 156, the condition is tested and if found satisfied, the operation is performed.

The LET command 158 is for altering a variable value in the symbol table.

There is an instruction 160 in the form "mailmove X.X files", where "X.X" is a target electronic mail address and "files" are a list of the files required in subsequent processing. If this instruction is received, then the current script file is combined into a single composite file with the file of variable values (known as the symbol table) and the files specified. This combined file is known as a "pack-up and move" file. As mentioned previously, the symbol table includes a current line indicator. The file is sent by electronic mail to a target address.

This "pack-up and move" file resulting from the mailmove operation contains all the information necessary to continue the processing at a later time, from where execution last left off, as described above.

The ability to pack-up and move is useful in a distributed process such as the transcription operation of the preferred system as it allows a process to be started at one location eg. a user terminal 2 or corrector terminal 12 and continued elsewhere eg. on the server 6.

Automatic Speech Recognition

The server 6 processes each dictation request and forwards it to an available speech recognition processor 8 where automatic speech recognition is undertaken resulting in a text data file. The automatic speech recognition is undertaken using conventional methods. The method which is used to Hidden Markov Modelling of speech as described in "Automatic Speech Recognition" by Kai-Fu Lee, Kluwer Academic Publishers 1989.

Figure 5:
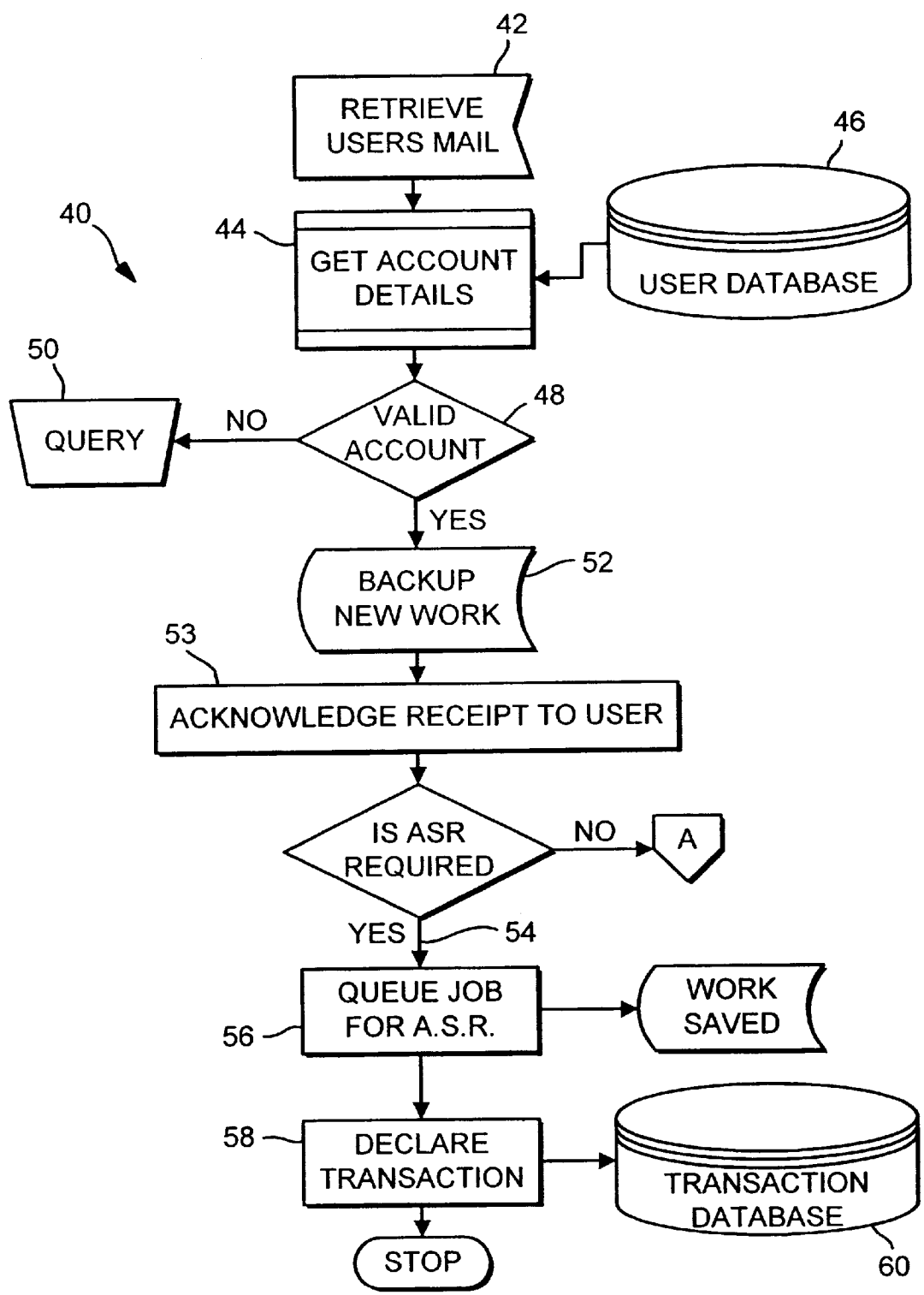
FIG. 5 is a schematic diagram illustrating the first part of the speech recognition stage, namely job control.
Figure 6:
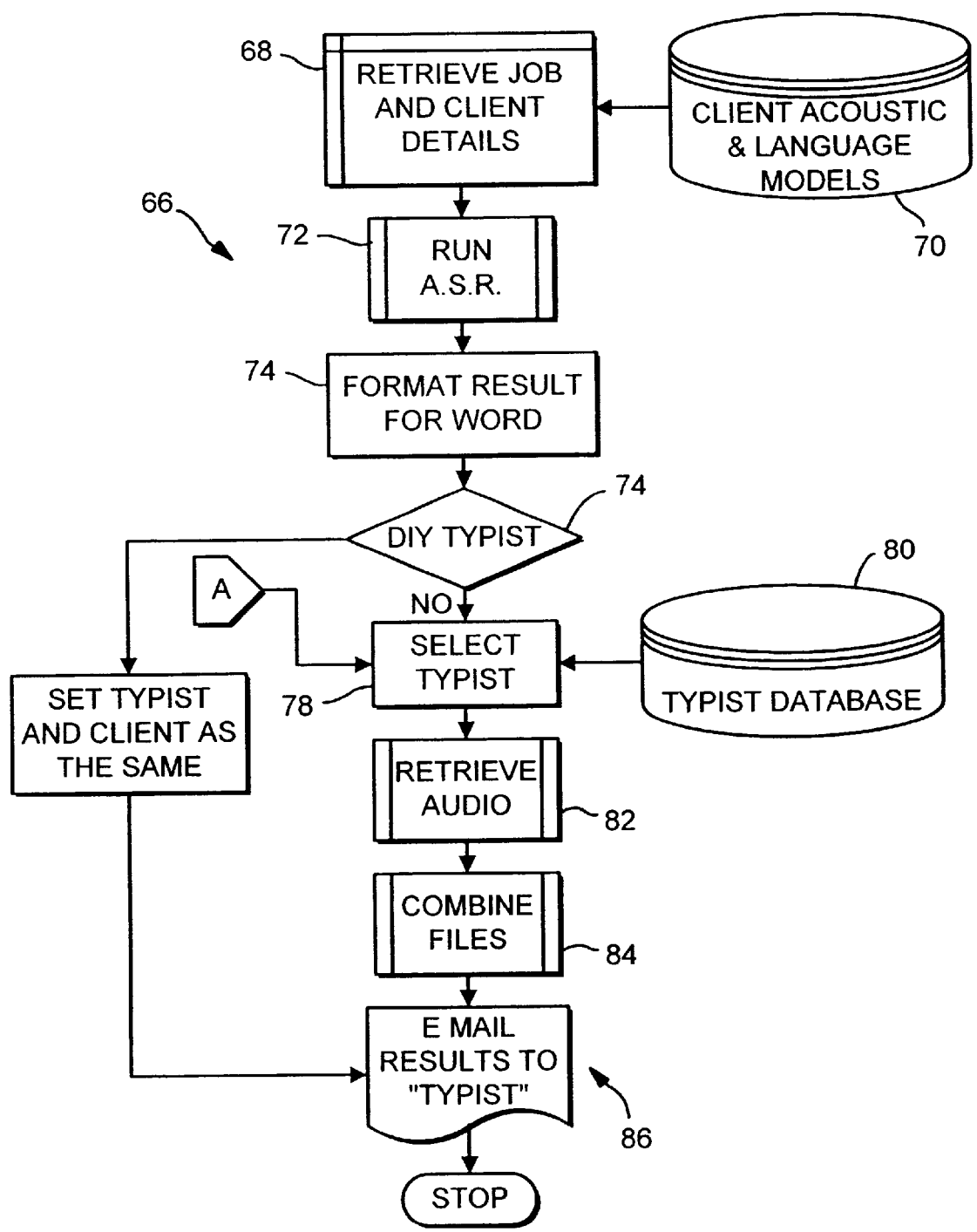
FIG. 6 is a schematic diagram illustrating the second part of the speech recognition stage, namely automatic speech recognition.

The first part of the speech recognition stage 18 including queuing a job for automatic speech recognition is shown in FIG. 5. The second part including running automatic speech recognition and subsequent assignment to a corrector terminal 12 is shown in FIG. 6.

As shown in FIG. 5, queuing 40 a job for Automatic Speech Recognition involves the server 6 retrieving 42 the E-mail message which is the user's transcription request. The transcription request is a single file with a fixed name. The format of the transcription request is determined by the pack-up-and-move control scheme of the server 6 and includes information identifying the user.

The following steps are then undertaken under the control of the server 6 using its pack-up-and-move control scheme. Firstly, the user's account details are retrieved 44 from a database 46 and the status of the account as valid or not is checked 48. If an account is found to be invalid, a query 50 is flagged to an administrator.

If the status is acceptable, the transcription request is recorded 52 and receipt is acknowledged 53 to the user by electronic mail.

If automatic speech recognition is required 54, the transcription request, otherwise denoted as a "job", is queued 56 for automatic speech recognition. This is denoted or declared as a "transaction" 58. Information regarding the job which has been queued is then sent to a transaction database 60. By querying the database the administrator can determine the history and current status of each job.

Figure 8:
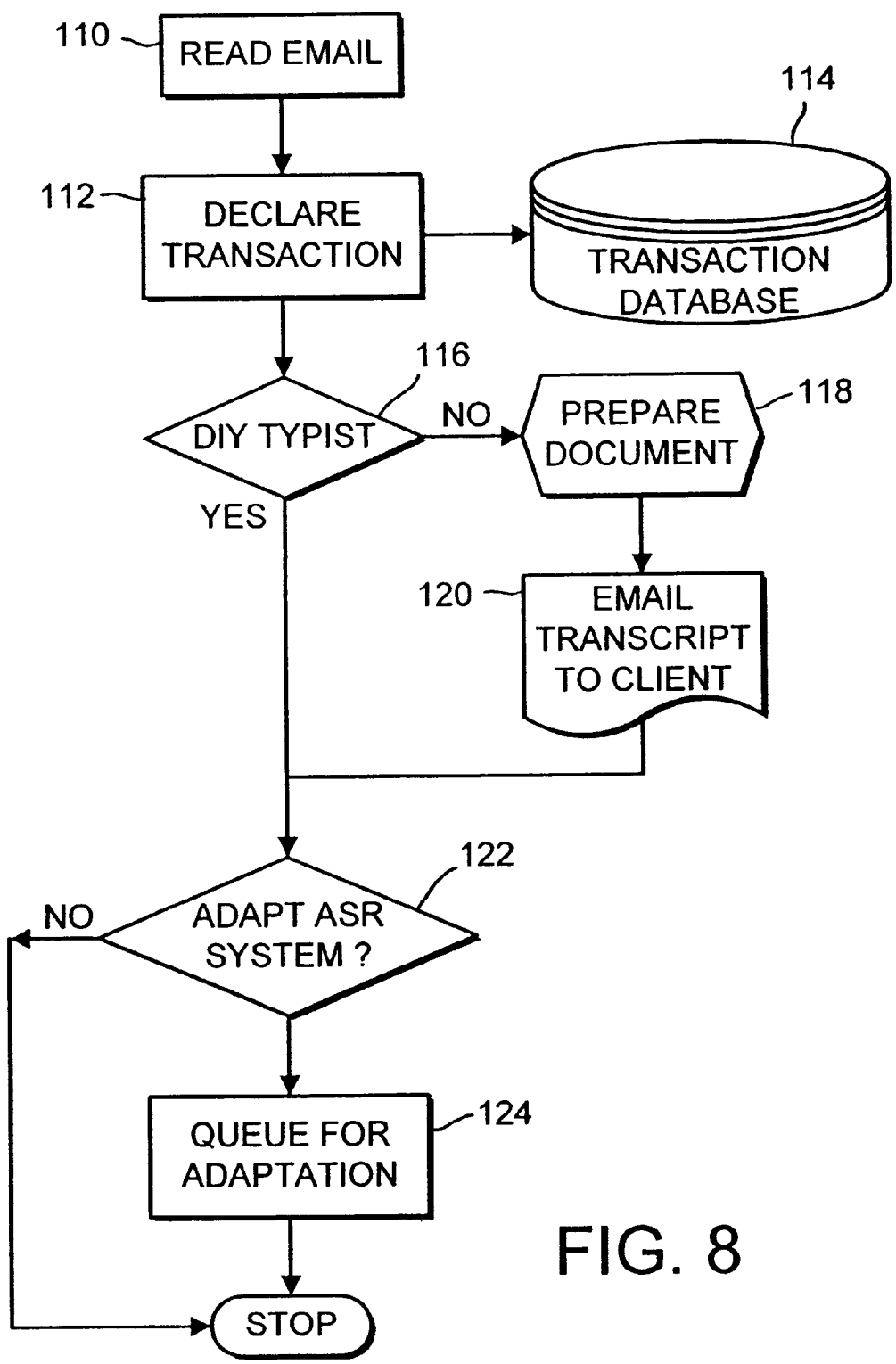
FIG. 8 is a schematic diagram illustrating the first part of the adaptation stage, namely queuing for adaptation.

The server 6 controls assignment of jobs to speech recognition processors 8. When a processor 8 becomes available, as shown in FIG. 8, the next job is selected 62 from the queue and transferred 64 to the processor 8 in a pack-up and move operation.

Automatic speech recognition 66 is then undertaken, basically as shown in FIG. 6. Client details are retrieved 68 by the processor 8 from a database 70 including statistical models of the user's voice ("automatic models") and also language models based on text subject, eg. legal, medical etc. These models and the job for transcription are used in automatic speech recognition 72 which involves applying the models to decode the speech and provide corresponding transcribed words in a result file which includes data of the beginning and end times of each utterance.

The result file is processed 74 into a format suitable for word-processing using a conventional text word processor, such as Microsoft Word. The timing information is included in the processed result file in a hidden manner for use at the subsequent error correction stage 20.

A corrector terminal 12 must then be chosen to enable proof-reading and manual error correction of the result file. If the user does not elect 76 to do this himself or herself, the server 6 acts to select a corrector terminal 12 from a database taking into account the availability of corrector terminals, and characteristics of, the human correctors who use them, matching, where possible, the user geographical domain with the domain of the human correctors regional or national accent (if any), and the area of specialisation (legal, technical, medical etc) of user and corrector. Mostly, the server 6 controls to which corrector terminal 12 a file is sent either dependent upon the clients wishes or alternatively dependent on selecting a corrector in a geographical area where there is expected to be in use a similar speech dialect or accent to that of the client who recorded the speech.

The recorded speech, ie. audio, file is also retrieved 82 in the server 6, and combined 84 under control of the server 6 using its pack-up-and-move scheme with the transcription data of the result file. This combined file is then transferred 86 to the selected corrector terminal 12 by electronic mail.

Speech transfer to a Corrector

Once the automatic speech recognition process is completed, the server 6 E-mails the resulting text file to a corrector terminal 12. As transmission is by E-mail, data transport costs are low. Furthermore differences in time zones are exploited, in particular by E-Mailing to a corrector terminal during its manual operators working hours.

Error Correction

At the corrector terminal 12 which includes personal computer, a VDU and a keyboard, the text file is viewed using standard word processor software. The original recorded speech is sent with the text file to the corrector terminal. The system includes several corrector terminals.

The file is received by the corrector terminal 12 by E-mail. The recorded speech is sent in a compressed format.

The text is corrected using a conventional keyboard. Words highlighted in the text are simultaneous output as speech audio signals from a loud speaker of the correction terminal 12. This allows a simple "watch and listen" system of correction which is very time efficient and is described in more detail below.

Figure 7:
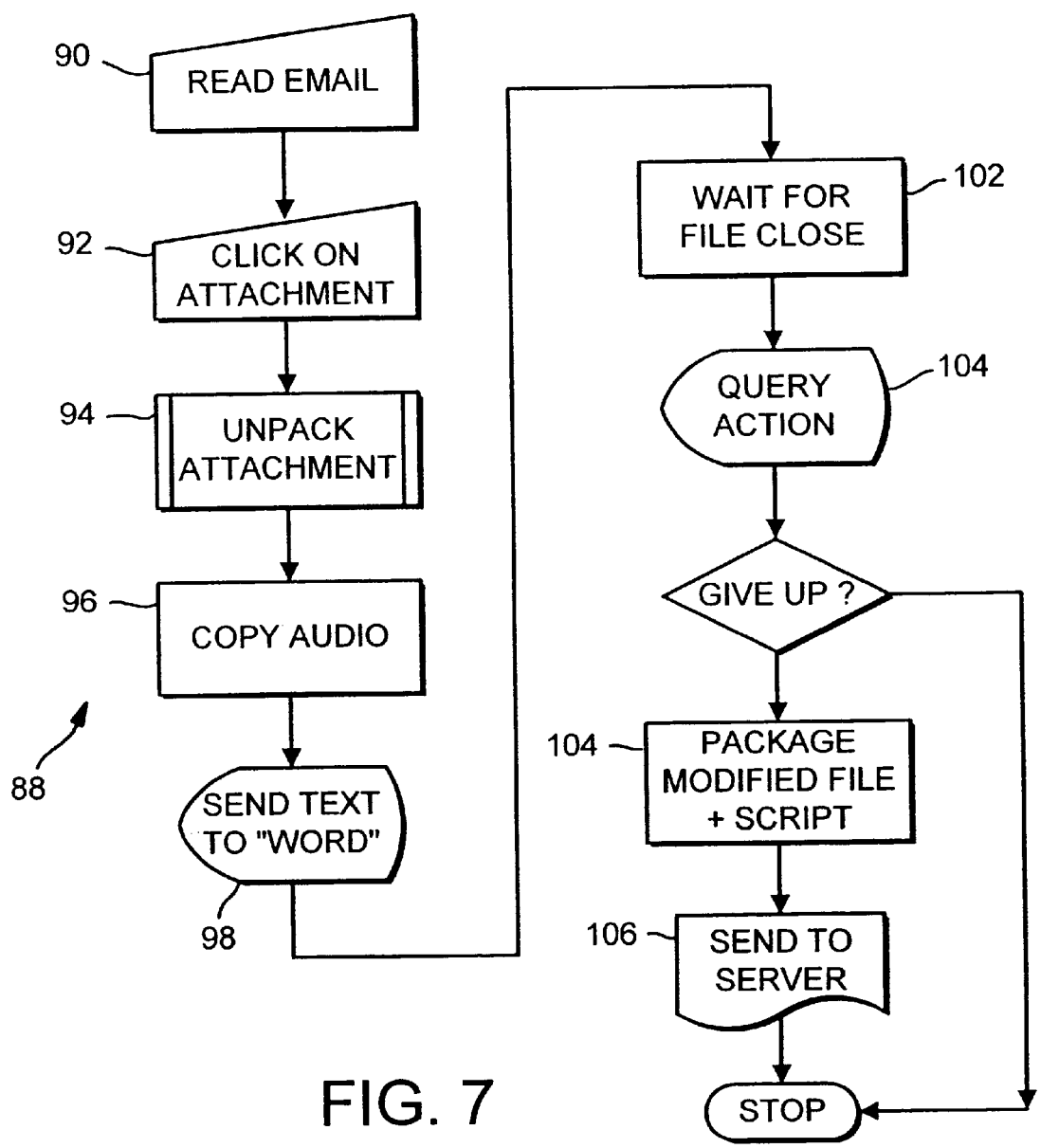
FIG. 7 is a schematic diagram illustrating the error correction stage.

As shown in FIG. 7, manual error correction 88 is undertaken at the correction terminal 12 by the human corrector who reads 90 the received electronic mail which has a text file attachment of the results file from automatic speech recognition. The results file is "clicked on" 92 ie. selected using eg. a conventional computer mouse, causing pack-up-and-move control to be invoked to unpack 94 the attached result file in which both the transcript and the audio file are found. The audio data is copied 96 into a file having a name which is assigned according a predetermined rule, in particular, in the preferred system, it differs only from the name of the corresponding transcript by its extension name.

The names of the audio file and transcript thus both have names in a format X:/dir1/dir2/name.xxx where xxx differ. The transcript is read 98 into a word processor, such as Microsoft Word where manual correction is undertaken by way of a keyword 100 at the correction terminal 12. In correcting, the hidden timing information and the audio file are used to assist the correction process, using cursor synchronised playback as described below.

Once the correction session has been completed, the text file of the transcript is closed. The corrector terminal 12 acts to monitor closure of the file, and when it so determines 102, acts to enquire 104 of the human corrector whether the modifications are complete. If the answer is yes, the modified transcript is packaged up 104 and sent 106 in a pack-up-and-move operation of the server 6 for onward communication back to the user. Alternatively, it is output 108 to, for example, a printer to be sent to the user by post.

Cursor Synchronised Playback

The result of automatic speech recognition is a text file in which each word is "tagged", ie. associated with, a time vector which relates the word to the word start time and duration within the speech record. This data is encoded in a format invisible to the human corrector as a digital tag. The tag includes a timing vector T which represents the start time and duration of the utterance that is associated with the tagged text word state parameter U which denotes whether or not the word has been scanned, and an optional audio identifier X which refers to the name of the recorded speech file.

For example, a word can have a tag W-XY-199-10 which denotes that the word as recognised is in state W, was produced from speech record XY and has a start time of 199 time units (assuming the speech record starts at time=0) and extends for 10 time units. This data can be encoded in a variety of ways.

Given a set of tagged words and an associated audio data ie. speech file, text and audio are cross-indexed. A position in the audio can be translated into a position within the text document and vice versa. The optional audio identifier information allows simultaneous display of multiple documents, with possible cut-and-paste operations between them. The optional state information allows checking to be undertaken at a later stage that every word has been proof-read.

When the corrector terminal is used in synchronised playback mode, the speech record is replayed over the loudspeaker of the correction unit from the text word on the screen at which the cursor lies. The word at which the cursor lies is highlighted as are the two following words. The cursor position is moved word by word as the corresponding sections of the recorded speech are replayed. The triple-word-highlight feature aids the human corrector in checking the immediately following words have been recognised correctly by the automatic speech recognition processor as the words can be reviewed in context.

As each text word has an associated time vector corresponding to the appropriate time point in the speech record, it is easy to shift forward and/or back through the words to the desired point where synchronised re-play is desired. For example under keypad or mouse (point and click) control (or use of a foot pedal control), the ongoing playback of successive words can be discontinued and the cursor shifted elsewhere to another word. The cursor can be shifted, rapidly if desired, forward and backwards. If a word is still not clearly understood after playback, it can be played back repeatedly until the human corrector can understand the intended text word and make an appropriate correction via his or her keyboard.

The corrector terminal could operate with some industry standard word processor, such as Microsoft Word, as used for document browsing, and text amendment and correction. By selecting the appropriate icon using a mouse, the work processor operates to display the text file visually on the screen. Stop, play, fast forward and rewind icons are displayed and can be selected using the mouse to control the synchronised playback. Alternatively the keyboard can be used for control. Another option would to have a foot pedal control.

A personal computer loaded with Microsoft Word processor software is but one example of a word processor in which the facility could be provided; it could be used with other word processors.

Text Return

Once the correction operation is complete, the corrected text file is faxed to the client, or sent via E-mail through the system to the clients terminal 2, or some other designated user terminal 2. As another option, it can be printed out and dispatched to the client by other means such as by courier or by post.

Automatic Speech Recognition Adaptation

The corrections which were made are returned to the ASR processor 8 which undertook the automatic speech recognition where they are used to adapt the automatic speech recognition method for greater accuracy in the future. This is done using Maximum Likelihood Linear Regression applied to Hidden Markov Models as described in "Speaker adaptation of HMMs using linear regression" by C J Legetter and P C Woodland Technical Report TR 181. CUED, 1994, Cambridge University.

Where the recorded speech is of low quality such as some audio-cassette signals or mobile telephone signals or analogue. Telephone signals, the speech-to-text conversion may be handled without the use of automatic speech recognition, by an audio typist.

As shown in FIG. 8, in the preferred embodiment, the transcript returned from the corrector terminal 12 to the server 8 is noted by polling 110 in an incoming-electronic-mail box at which the transcript is expected to be received. When it is returned, a transaction is declared to have occurred 112 and this is recorded in a further transaction database 114. If the job is not flagged 116 as DIY (ie. Do it yourself) correction by the user, it is formulated 118 into an electronic mail message and sent 120 via electronic mail to the user. More specifically, the transcript is a text attachment, suitable for word processor reading, attached to a short electronic mail message.

The server 6 determines 122 whether the user is one to which the automatic speech recognition adapts. If so, the job including the audio file and modified transcript is queued for adaptation of the associated ASR processor 8.

Figure 9:
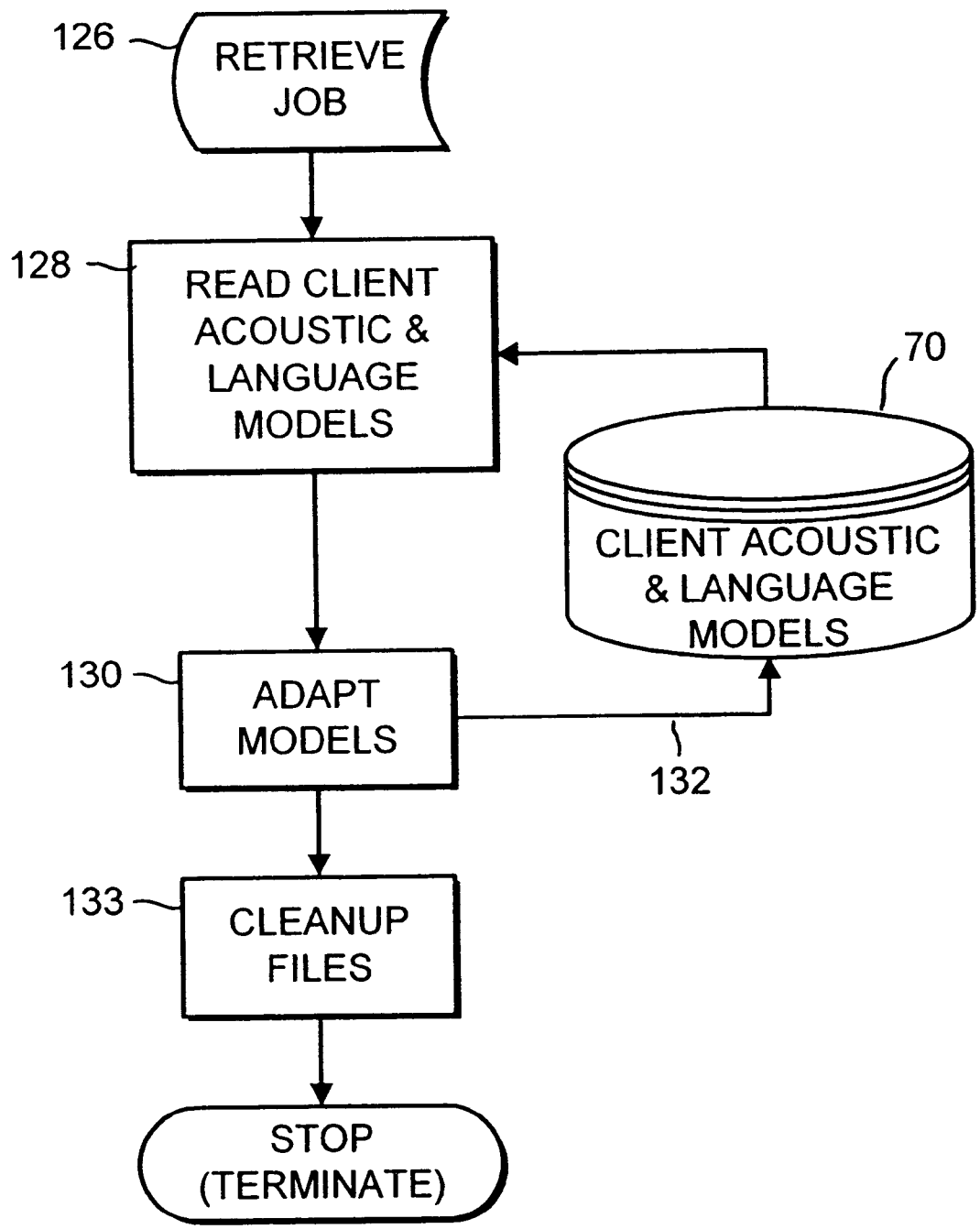
FIG. 9 is a schematic diagram illustrating the second part of the adaptation stage, namely adaptation.

The "job" is returned to the ASR processor 8 in a pack-up-move operation. As shown in FIG. 9, the ASR processor 8 adapts by mathematical processes whereby speech models are fine-tuned to be more accurate dependent upon previous success. Speaker adaptation is undertaken whereby there is adaptation of models to better fit the speech characteristics of a particular speaker (or some group of speakers). Language models are also adapted to better fit the likely vocabulary or word usage patterns of a speaker or group of speakers. The processor 8 retrieves the transcript and corresponding audio speech and also retrieves 128 the acoustic and language models used from the database 70. Models are adapted 130 in consequence and recorded 132 in the database 70. Once the adaptation has been completed, any obsolete temporary files on the server are deleted 133.

Pooled Adaptation

When registering, each user specifies a technical disciple/subject matter area (eg. legal, medical, general business etc). The discipline associated with each user can be updated subsequently, for example immediately prior to speech capture. Similarly, an accent domain (eg. country and regional variant) is specified when the user registers. In consequence, each dictation request includes information of the user's accent domain and technical discipline in addition to data identifying the user.

Figure 15:
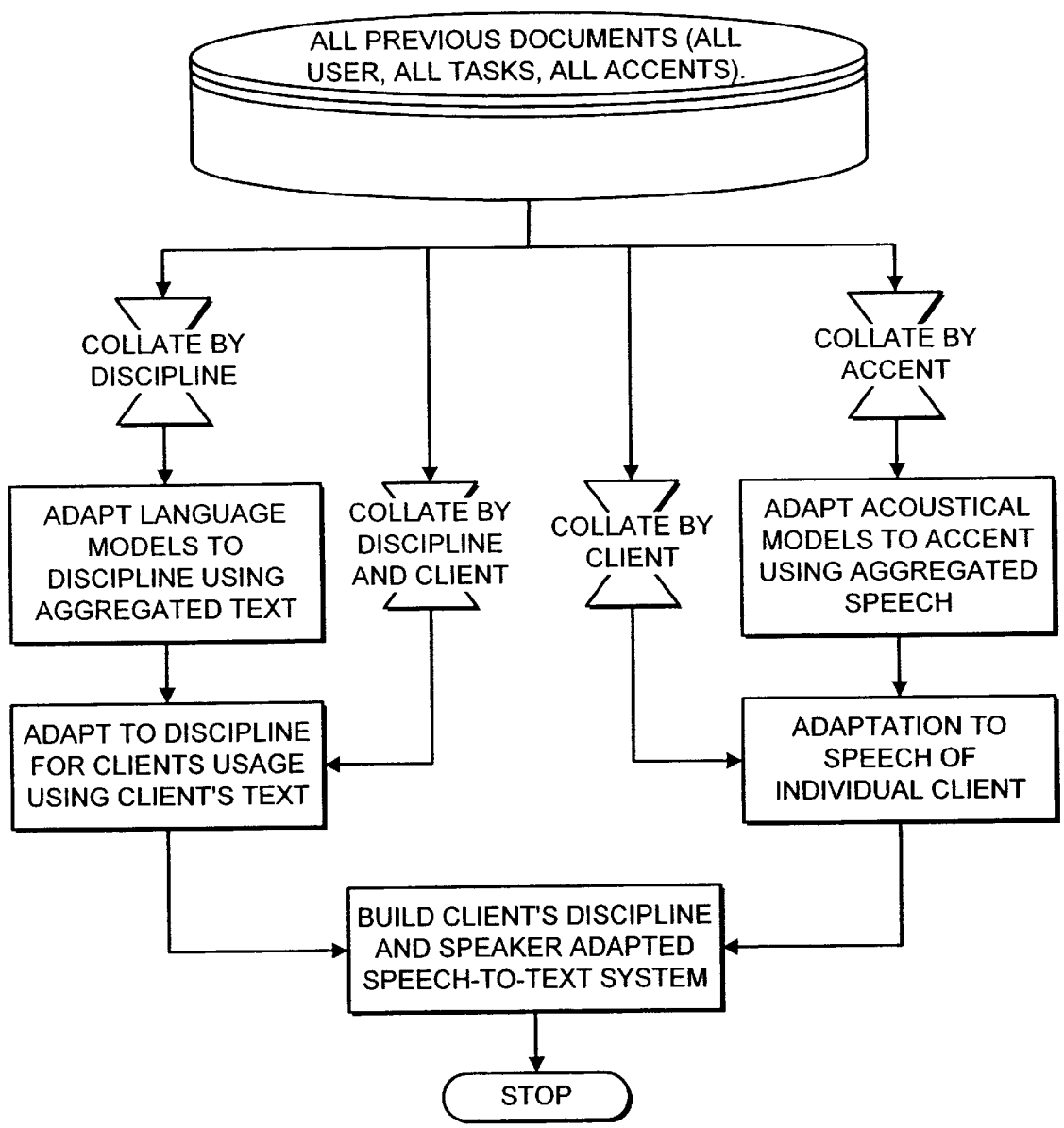
FIG. 15 is a schematic diagram illustrating the adaptation used to improve performance of the ASR processors.

The speech and text results are collated by accent and by technical discipline and used for adaptation are illustrated schematically in FIG. 15 and described in detail below.

Accent Pooled Adaptation

The ASR processors 8, rather than adapting acoustic models to the voice patterns of an individual speaker only, are adapted using large volumes of speech data from multiple speakers. For each ASR processor 8 all the speech used for adaptation is selected as being from one of the accent domains. Thus, it can be considered that the speech used for adaptation is pooled according to accent domain.

In consequence, the ASR processors 8 operate to recognise speech in a manner which is speaker independent but restricted by accent domain. New speakers benefit by having their speech converted to text using word models previously adapted to their accent. The success rate of speech recognition from new speakers can be determined as a measure of performance.

The use of speech data for adaptation selected by accent domain enables performance of the ASR processor 8 adapted using that speech data to improve through use over time.

User specific acoustic models are also adapted using the corrections in transcripts from the specific user.

To summarise, the ASR processors 8 are trained by large volumes of speech data from multiple speakers. The result is a speaker independent system. Tests are performed on unseen speakers to assess speaker independent performance.

Typically speaker independent performance is restricted to membership of some accent group. Systems are trained for US accents and are (unsurprisingly) less good with British or other non-US accents. Accents vary further on a geographically localised level.

The server 6 allows each dictation client to choose a accent group from a list. All adaptation data from members of that group is pooled and used to adapt a general model for that accent. Adaptation data from each person is also used to adapt a speaker specific personal acoustic model from their accent adapted acoustic model.

Speaker independent performance is therefore adapted to the local speech community. New users benefit by having immediate access to trained locally dialect models.

Pooling by Technical Discipline

Language adaptation, ie. adaptation of models of words, is a slow process compared to adaptation of acoustic methods of particular speakers or groups of speakers.

In the preferred embodiment, the ASR processors 8 adapt language models using the large volumes of text and audio data available from multiple users within each selected technical discipline. The data is collected according to the technical discipline specified by the user, but can be redefined subsequently so as to split the data into sub-groups. In the preferred embodiment, adapting the language models on the ASR processors 8 by technical discipline has the advantage that given man speakers, but fewer technical disciplines, for example, the data accumulates much more rapidly and thus the language models can be adapted much more quickly. This has a benefit to a new user of the system as the language models are better trained to the vocabulary or word usage patterns which he or she might use.

By way of example, where the system is available in a mining community in Wales, and has not previously been used in that geographical area nor for a mining related discipline, the system is configured to offer a local welsh accent domain and a mining-related discipline, but the language models used are initially no different to those used for the general UK English accent domain and general English language discipline. The first several users may find that the performance of the system in automatic speech recognition is relatively poor but improves through adaptation of acoustic models to their accent. They might find that many industry-specific words and terms are not known to the system.

Some time later both, new and existing users would find that the Welsh accent has been adapted so that the performance is improved, not only because the acoustic models have made the system better adapted to their accent, but also because the language models have become better adapted to the industry jargon. This improvement continues through subsequent use.

In summary, language pooling across multiple users is used in the preferred system. Because of the large client base that exists in a client/server architecture this allows large volumes of data to be collated quickly.

The "data pools" are defined according to pre-assigned domain (or discipline) classification, as collected by the initial user interface software for dictation recording. The list of supported disciplines is initially determined by typist expertise and market requirements and is therefore a necessarily requested item of information. These can be redefined further into subgroups to extend modelling potential.

The resulting pool is used as the basis for training and adapting language models.

Known methods of language model parameter estimation are used. Given a large volume of data collected in this fashioned, direct statistical model estimation can be used as described F. Jelinek, "Self-Organised Language Modelling for Speech Recognition" in Readings in Speech Recognition, by Alex Waibel and Kai-Fu Lee, Morgan-Kaufmann. Given smaller volumes of data, model interpolation or other methods of adaptation may be applied as described in J Ueberla, "Domain Adaptation with Clustered Language Models", IEEE ICASSP, 1997, Germany, Pp 807–810 and Besling and Meier, "Language Model Speaker Adaptation", Eurospeech, Madried, Spain, 1995, pp 1755–1758. IEEE ICASSP is short for the International Electrical and Electronic Engineers International Conference on Acoustics, Speech and Signal Processing.

Transcript Filtering Before Adaptation

After correction, a resultant transcript will frequently differ from the corresponding audio speech data. For example, phrases such as: delete this sentence, insert date, please insert Fred's address here etc will have been acted upon. Furthermore, some mistakes in the audio speech obvious to the human corrector may be corrected in the transcript at the correctors own initiative eg. previous British Prime Minister Tom Major (his correct name being John Major). Accordingly, it is necessary to distinguish which corrections are a consequence of imperfect automatic speech recognition and which are due to intelligent interpretation by the human corrector.

In consequence the resultant transcript is screened automatically so that intelligent interpretations applied by the human corrector are not used for adaptation of the ASR processor 8.

The method used for screening is based on reapplying automatic speech recognition techniques but with some very different controlling factors.

Suppose a person has said "Dear John I mean Jack, Thanks for your input.". Irrespective of the automatically recognised output, the audio-typist corrected result is "Dear Jack, Thanks for your input".

Firstly, it is noted that screening is error detection not error correction. One considers the word sequence that is output from the correction terminal unit. One is required to find cases where deletion of the word or replacement with some arbitrary "other-word" looks much more likely than the specific word given in a corrected transcript. In the given example, three words need to be deleted. The identity of the inserted words is not needed to detect the problem (but would be needed to correct the problem).

In the literature, an arbitrary "any-word" model is called a babble-model. It can be built in many ways using conventional methods of model training. No form of orthographic representation need be considered.

The ASR processor 8 is a special form of a parser, and as such is controlled by machine grammar. Such a grammar defines the allowable sequences of words. It does not control their timing. At one extreme a grammar could specify that any word ordering is allowed. At another extreme a grammar could specify that only one sequence of words is allowed.

A recognition grammar is generally conditioned by probabilities. A probability will imply some degree of penalty on the use of that option. Thus, in the example one might specify a grammar which dictates that "Dear John . . . " is the preferred explanation of the spoken input but that it is possible that some arbitrary words have been inserted between "John" and "comman".

Simple grammars can be drawn with box and arrow diagrams, and the grammar requirements herein are sufficiently simple.

Figure 12:
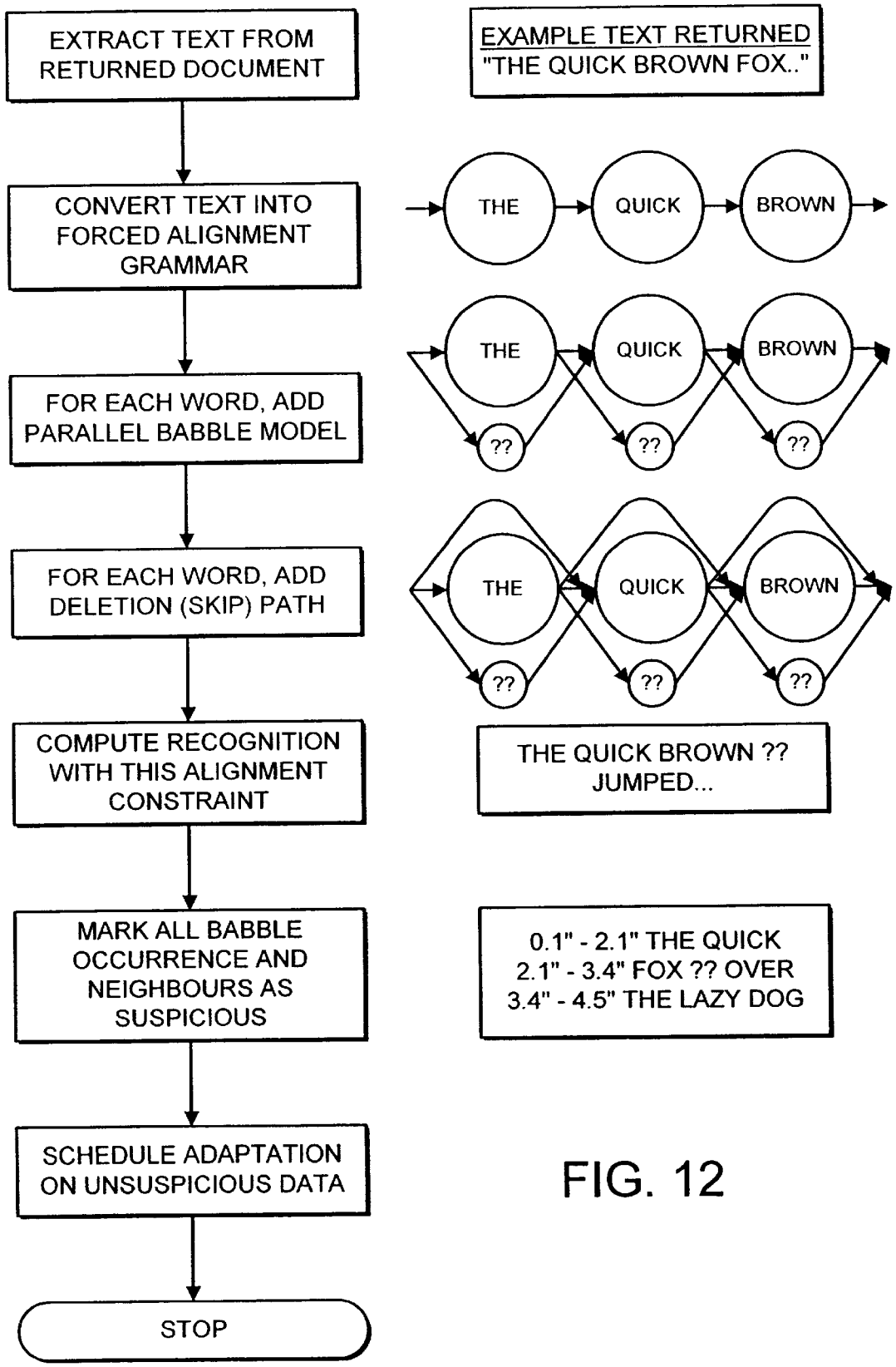
FIG. 12 is a schematic diagram illustrating automatic screening for adaptation.

The screening process is as follows. Given a returned transcript one creates a grammar which forces the given word sequence to occur. That grammar is expanded, as shown in FIG. 12, by introducing a babble model in parallel with each word and connecting them as per-word alternative paths. Deletion paths are added to account for complete variation. Noise and silence is introduced optionally between all words to allow for the natural discontinuity that may arise in the spoken utterance.

Probabilities are assigned to give a high level of belief to the transcriber's transcription. If the weights are set too low, real discrepancies will not be detected; if too high, many errors will be reported that do not actually exist. These probabilities are computed by experiment to achieve a high rate of error detection and a rate of false alarm which is not so large that a great deal of data is sacrificed.

Recognition is executed with this restricting grammar. The output, which includes timing information, is filtered so that babble models and their sequential neighbours are not admitted as training data. The example is therefore reduced to "Dear" and "Thanks for your input period".

Learning to Recognise New Words

The corrected transcript returned from a corrector terminal 12 to the ASR processor 8 will very often contain words unknown to the ASR processor and it is desirable to add such words to the vocabulary of the ASR processor 8.

Figure 13:
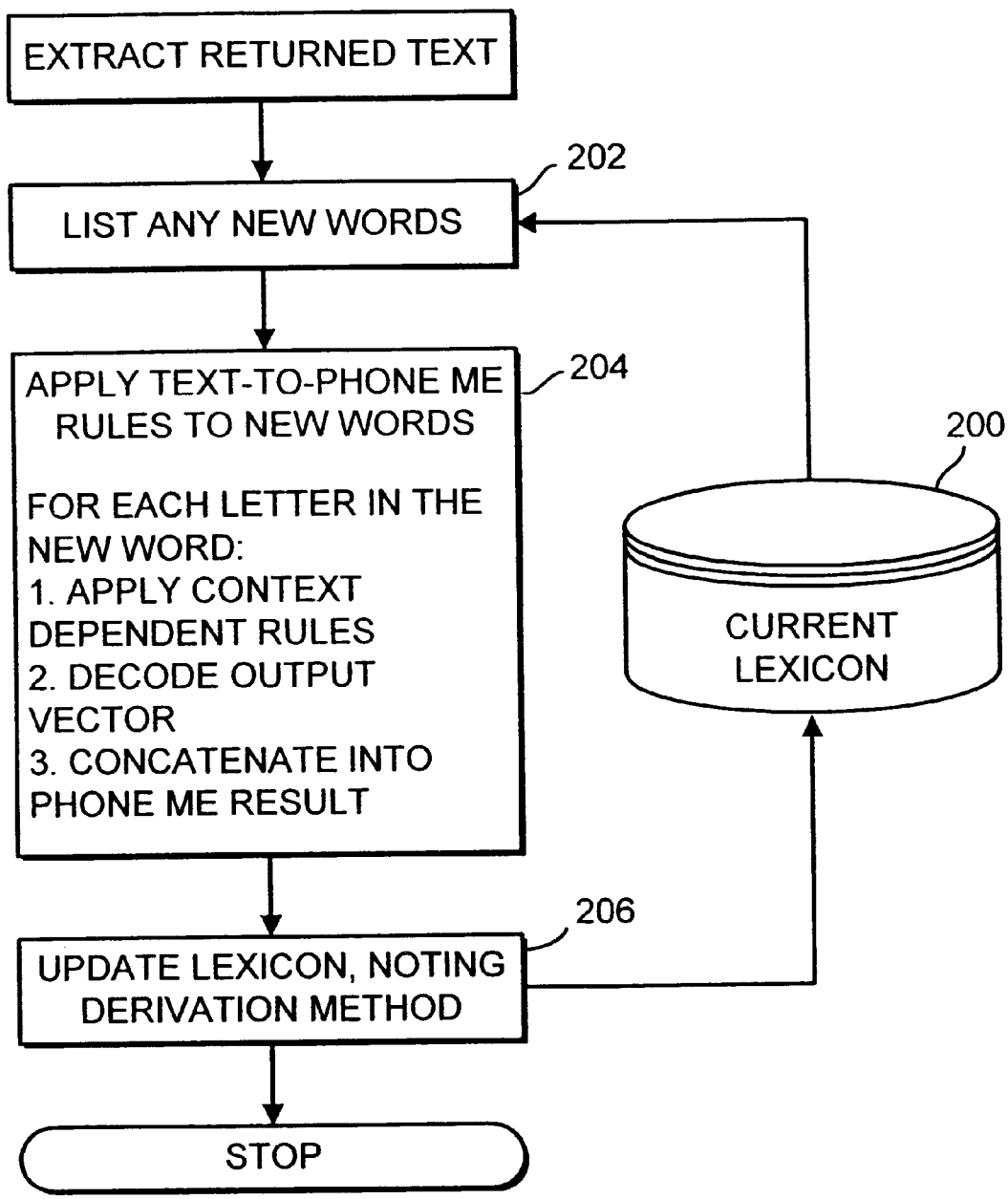
FIG. 13 is a schematic diagram illustrating new word acquisition.

To determine which are the new words, as illustrated in FIG. 13 each word is checked against a dictionary (current lexicon 200) and a list of unknown new words 202 results. A text to speech (more correctly, text to phoneme) conversion is then undertaken One approach is to use the known approach described in J Lucassen and R Mercer "An Information Theoretic approach to the automatic determination of phonetic baseforms" IEEE ICASSP* March 1984, pp 42.5.1–4. IEEE ICASSP is short for the International Electrical and Electronic Engineers International Conference on Acoustics, Speech and Signal Processing.

A similar approach, which described in more detail below, by applying text to phoneme conversion rules 204 and updating the dictionary as a result 206.

Figure 14:
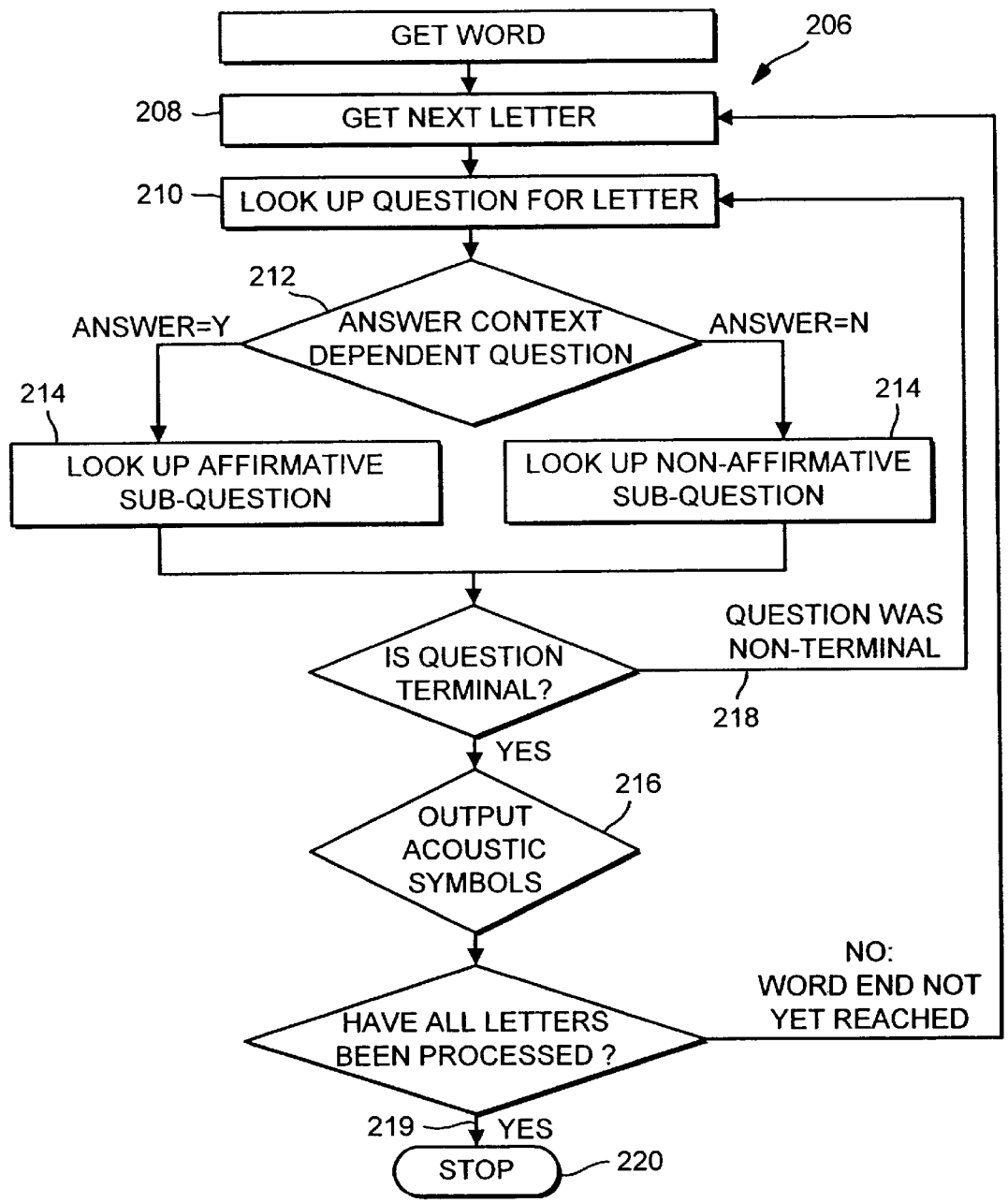
FIG. 14 is a schematic diagram illustrating part of new word acquisition, namely deriving a pronunciation for a previously unseen word.

The application of text to phoneme conversion rules 204 is shown in more detail in FIG. 14. As shown in FIG. 14, a text word is considered as a series of letters. A letter is taken 208 and an associated question is looked up 210. Dependent on the answer, the corresponding symbol ie. phoneme can be output 216 or one or more further questions applied 218. The questions are applied in a recursive or hierarchical manner until a complete pronunciation is determined.

Questions can be, for example, "is the next letter a vowel?" or "is the previous letter an i?" The questions are context dependent as they depend on previously determined letters in the word. For example, where an s is determined, it is considered to correspond to a first phoneme set except where it is found that a letter t precedes it in which it is considered to correspond to a second phoneme set.

It will be seen that although the rules do not take account of context, each letter is treated independently and the resulting pronunciation is concatenated.

A question 212 can have associated sub-questions 214. As shown in FIG. 14, sub-questions are either further questions or indicates to terminate questions on that letter and output phonemes. When all the letters of a word have been processed 218 conversion stops 220.

What is claimed is:

1. A transcription system for generating text for users in accordance with recorded speeches making use of automatic speech recognition, the system comprising:
   a plurality of user terminals for recording speeches;
   at least one automatic speech recognition processor to generate text from recorded speeches; and
   communication means operative to return corresponding text to respective users;
   wherein at least one automatic speech recognition processor is adapted to improve recognition accuracy for a user using selected data of the recorded speeches and the corresponding texts of at least one other user;
   said speeches each having an identifier associated with it corresponding to subject matter area and/or user accent; and
   said data being selected and pooled dependent upon identifiers common to said speeches;
   said automatic speech recognition processor having a different language model for each identifier; and
   each language model being adapted using pooled data with the corresponding identifier.

2. A system as claimed in claim 1, wherein each language model is adapted to acquire new words which occur in the corresponding subject matter area.

3. A system as claimed in claim 1, wherein the automatic speech recognition processor learns the probabilities of word occurrences dependent on subject matter area.

4. A system as claimed in claim 1, wherein upon the recorded speech being received by one of said automatic speech recognition processors, the identifier of user accent is used to select an acoustic model to be applied by the processors in automatic speech recognition and the identifier of subject matter area is used to select a language model to be applied in automatic speech recognition.

5. A system as claimed in claim 1, wherein said at leat one user terminal is remote from said at least one automatic speech recognition processor.

6. A system as claimed in claim 1, wherein the speech to text convertor includes a server remote from said at least one user terminal, the server being operative to control transfer of recorded speech files to a selected automatic speech recognition processor.

7. A system s claimed in claim 1, wherein each user terminal communicates the recorded speech files to the remote server by electronic mail.

8. A system as claimed in claim 1, wherein text files resulting from automatic speech recognition are sent to correction units.

9. A system as claimed in claim 8, wherein the correction units are remote from the automatic speech recognition processors.

10. A system as claimed in claim 8, wherein communications from the automatic speech recognition processors to each correction unit are undertaken under the control of the server.

11. A system as claimed in claim 8, wherein the correction units are remotely distributed.

12. A system as claimed in claim 8, wherein the correction units communicate to said at least one user terminal by electronic mail.

13. A system as claimed in claim 8, wherein each correction unit includes a visual display unit for display of the text and a manual interface usable to select text.

14. A system as claimed in claim 8, wherein correction is effected by a manual operation.

15. A system as claimed in claim 8, wherein corrections are recorded and transmitted back to the automatic speech recognition processor which undertook the automatic speech recognition for adaptation of the operation of the automatic speech recognition processor.

16. A system as claimed in claim 8, wherein corrections are sent by electronic mail.

17. A system as claimed in claim 1, wherein the recorded speech is continuous speech.

18. A system as claimed in claim 1, wherein a server acts to control assignment of recorded speech files for processing to automatic speech processors by queuing the received speech files and submitting them according to predetermined rules.

19. A system as claimed in claim 18, wherein the predetermined rules by which the server queues jobs is one of urgency and user priority rating.

20. A system as claimed in claim 1, wherein speech to text conversion is done as a single fully automatic operation.

21. A system as claimed in claim 1, wherein speech to text conversion is done as a part-automatic and part-manual operation using the automatic speech recognition processor and correction unit, respectively.

22. A transcription method for generating text for users in accordance with recorded speeches making use of automatic speech recognition, comprising:
   recording speeches at a plurality of user terminals;
   using at least one automatic speech recognition processor to generate text from said recorded speeches; and
   returning corresponding text to respective users; wherein selected data of said recorded speeches and corresponding text of multiple users are used to adapt operation of at least one automatic speech recognition processor to improve recognition accuracy;
   each speech being marked with an identifier corresponding to subject matter area and/or user accent;
   said data being selected and pooled dependent upon identifiers common to said speeches;
   a different language model being used by the automatic speech recognition processor for speeches having different identifier; and
   each language model being adapted using pooled data with a corresponding identifiers.

* * * * *